July 27, 1954 A. W. VANCE 2,685,000
STABILIZED DIRECT CURRENT AMPLIFIER
Filed April 29, 1949
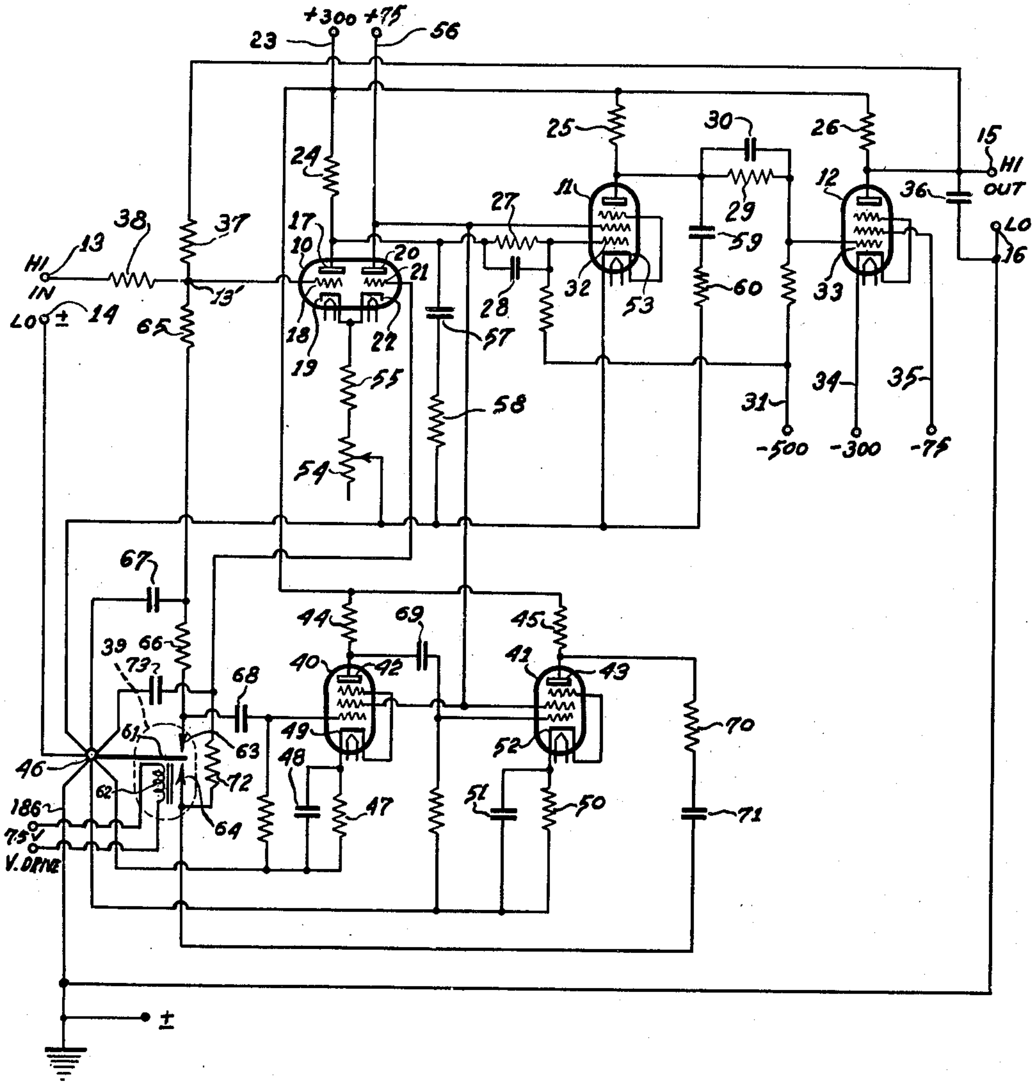
INVENTOR
ARTHUR W. VANCE
BY Morris A. Rabkin
ATTORNEY Patented July 27, 1954

2,685,000

UNITED STATES PATENT OFFICE 2,685,000

STABILIZED DIRECT CURRENT AMPLIFIER

Arthur W. Vance, Cranbury, N. J., assignor to Radio Corporation of America, a corporation of Delaware Application April 29, 1949, Serial No. 90,358

7 Claims. (Cl. 179—171)

This invention relates to direct current amplifiers, and more particularly to means for stabilizing the drift and automatically setting the zero of such amplifiers so that the output voltage will be zero when the input voltage is zero.

Amplifiers are normally stabilized relatively to gain by means of overall feedback. In the case of D. C. amplifiers, the gain expressed as a ratio of change of output voltage to a change of input voltage may be stabilized by this method, but overall feedback does not insure that the output voltage will be zero for zero input voltage. This adjustment must normally be made manually and the setting must be changed as a function of time since the tube characteristics change slightly with time. This adjustment is hereinafter called the zero or threshold adjustment. Variations in the required threshold adjustment to insure zero output for zero input are normally quite slow.

The present invention provides means for automatically and continuously stabilizing D. C. amplifiers for zero, drift and gain. Stabilization for gain is accomplished as usual by the use of overall feedback. Stabilization for zero and drift is accomplished by means including a contactor type of modulator which chops the error voltage so that it may be amplified in an A. C. amplifier. The output of this A. C. amplifier is rectified and applied to the D. C. amplifier at a point where the zero setting voltage is normally applied.

The present invention is disclosed but not claimed in a copending Goldberg and Lehmann application Ser. No. 90,072 filed April 28, 1949 for Direct Current Amplifiers. It differs from the invention claimed in the aforesaid application in that the same vibrator is utilized to chop the error voltage and to rectify the stabilization voltage. This reduces the required number of tubes and other components, permits effective synchronous rectification at very low levels, and provides automatic synchronization of the rectifier.

The object of the invention is to provide an improved circuit and method of operation whereby a D. C. amplifier is continuously and automatically stabilized so that its input and output voltages have their zero values simultaneously.

The invention will be better understood from the following description considered in connection with the accompanying drawings.

The single figure of the drawing is a wiring diagram of the improved circuit.

This figure shows the D. C. amplifier as including three stages 10, 11 and 12. Input voltage is applied to the terminals 13 and 14 and output voltage is obtained from the terminals 15 and 16. The first stage 10 is in the form of a duotriode 17—18—19 and 20—21—22. From a +300 v. lead 23, operating voltage is applied through a resistor 24 to the anode 17 and through resistors 25 and 26 respectively to the anodes of the tubes 11 and 12. The triode 17—18—19 is coupled to the input of the tube 11 through a resistor 27 which is shunted by a capacitor 28, and the tube 11 is coupled to the tube 12 through a resistor 29 which is shunted by a capacitor 30.

From a —500 v. lead 31 bias potential is applied to the control grids 32 and 33 of the tubes 11 and 12. The output tube 12 has its cathode connected to a —300 v. lead 34 and its screen grid connected to a —75 v. lead 35. A filter capacitor 36 is connected between the D. C. output terminals 15—16. An overall stabilizing circuit including a resistor 37 is connected from the output terminal 15 to the grid 18 and the input terminal 13 is connected to this grid through a resistor 38. This overall stabilizing circuit functions to stabilize the D. C. amplifier for gain.

An additional stabilizing circuit is provided for insuring that the input and output voltages of the D. C. amplifier have their zero values simultaneously. This additional stabilizing circuit includes a vibrator 39 and an A. C. amplifier including two stages 40 and 41.

Operating potential is applied to the anodes 42 and 43 of the tubes 40 and 41 from the lead 23 through the respective resistors 44 and 45. A grounded terminal 46, which is common to the D. C. input terminal 14 and the D. C. output terminal 16, (1) is connected through a resistor 47 shunted by a capacitor 48 to the cathode 49 of the tube 40 and (2) is connected through a resistor 50 shunted by a capacitor 51 to the cathode 52 of the tube 41.

The common terminal 46 also is directly connected to the cathode 53 of the D. C. amplifying tube 11 and is connected through an adjustable resistor 54 and a fixed resistor 55 to the cathodes 19 and 22 of the duotriode 10.

From a +75 v. lead 56, voltage is applied to the anode 20 of the duotriode 10 and to the screen grids of the tubes 11, 40 and 41. Connected across the outputs of the D. C. amplifying stages 10 and 11, respectively, are the A. C. filters 57—58 and 59—60.

The vibrator 39 includes a vibratory contact 61 which is connected to the common terminal 46 and is under the control of an operating coil 62 which is indicated as energized from a 7.5 v., 186 cycle source (not shown). The vibrator 39 also includes the fixed contacts 63 and 64.

The contact 63 has voltage applied to it from the D. C. input grid terminal 13' through a resistor 65 and a resistor 66 which is arranged to be shunted by a capacitor 67 when the contacts 61 and 63 are engaged. From the contact 63, an output voltage chopped at a frequency of 186 cycles per second is applied through a capacitor 68 to the control grid of the tube 40 which has its output coupled through a capacitor 69 to the input of the tube 41.

The output voltage of the A. C. amplifier is applied through a resistor 70 and a capacitor 71 to the contact 64 of the vibrator 39. The contacts 64 and 61 of the vibrator function to synchronously rectify the output voltage of the A. C. amplifier. This rectified voltage is applied to the grid 21 of the duotriode 10 through a resistor 72 which is shunted by a capacitor 73 when the contacts 61 and 64 are engaged.

With these connections, one side of the vibrator functions to chop the error voltage and to apply it through the coupling capacitor 68 to the input of the A. C. amplifier 40—41. The other side of the vibrator functions to rectify the output voltage of the amplifier 40—41 and to inject the stabilizing voltage into the grid circuit of the triode 20—21—22 so that the error voltage is nullified through the action of the feed-back loop which includes the resistor 37.

As indicated in the aforesaid Goldberg and Lehmann application, this type of stabilizing circuit has the important advantage that it has no substantial effect on the high frequency characteristics of the D. C. amplifier 10—11—12.

What is claimed is:

1. The combination of a D. C. amplifier having an output circuit and having an input stage including a duotriode tube having two control grids, two cathodes connected to each other, two anodes, and a cathode resistor connected in common to said cathodes, coupling means to connect said anodes to said output circuit, a feedback connection between said output circuit and one of said grids, a vibrator having a fixed and a movable contact and connected to convert D. C. voltage at said one grid to an A. C. voltage, an A. C. amplifier coupled to said vibrator and responsive to the A. C. output voltage of said vibrator, and a synchronous rectifier circuit comprising said movable contact and a further fixed vibrator contact coupled to the output of said A. C. amplifier and to the other of said grids for applying to said other grid a stabilizing voltage such that the voltage at said one grid and the output voltage of said D. C. amplifier are zero at the same time.

2. In a system providing stabilized operation of a D. C. amplifier of the type having first and second input circuits and an output circuit and having an inverse feedback connection between said output circuit and one of said input circuits, the combination with said D. C. amplifier of an A. C. amplifier having an input circuit and an output circuit, a vibrator having a pair of fixed contacts and a movable contact arranged to engage said fixed contacts alternately, a circuit connecting said first input circuit to said A. C. amplifier input circuit and including one of said fixed contacts, a circuit connecting said A. C. amplifier output circuit to said second input circuit and including the other of said fixed contacts, and a terminal common to all of said input and output circuits and connected to said movable contact.

3. A stabilized D. C. amplifier comprising, in combination, a multistage D. C. amplifier having first and second input circuits and an output circuit and having a gain-stabilizing inverse feedback connection between said output circuit and said first input circuit, an A. C. amplifier having an input circuit and an output circuit, a vibrator having a pair of fixed contacts, a movable contact, means to vibrate said movable contact to alternately engage said fixed contacts, a reference voltage point common to all of said input and output circuits, said movable contact being connected to said reference voltage point, a circuit connecting said first input circuit to said A. C. amplifier input circuit and including one of said fixed contacts, means comprising said movable contact, said one fixed contact, and including said vibrating means, to repeatedly connect said A. C. amplifier input circuit to said reference voltage point, a circuit connecting said A. C. amplifier output circuit to said second input circuit and including the other of said fixed contacts, and means including said other fixed contact, said movable contact, and said vibrating means, for synchronously rectifying the voltage in said A. C. amplifier output circuit to provide a D. C. stabilizing voltage to said second input circuit.

4. An amplifier as defined in claim 3 wherein the first stage of said D. C. amplifier comprises a duotriode tube having two grid electrodes and wherein said first and second input circuits comprise said two grid electrodes, said first stage further including a cathode resistor connected in common to both sections of said tube.

5. In a circuit of the class described having input and output terminals, the combination comprising a direct current amplifier having a signal voltage input thereof connected to said input terminals and the output connected to said output terminals, said direct current amplifier being internally connected to provide a negative output voltage for a positive input voltage, means connected between the signal voltage input and output of said direct current amplifier to provide a voltage proportional to drift voltage therein, amplifier means having the input thereof connected to said last-named means for providing a positive output for a positive input, energy storage means connected between the output of said amplifier means and a correction voltage input of said direct current amplifier, and means connected between said amplifier means input and said energy storage means for the alternate grounding thereof at a predetermined rate.

6. In a circuit of the class described having input and output terminals, the combination comprising a direct current amplifier having a signal voltage input thereof connected to said input terminals and the output thereof connected to said output terminals, said direct current amplifier being internally connected to provide a negative output voltage for a positive input voltage, means connected between the signal voltage input and the output of said direct current amplifier to provide a voltage proportional to drift voltage therein, an alternating current amplifier having the input connected to said means and being internally connected to provide a positive voltage output for a positive voltage input, a series connected storage capacitor and filtering network connected between said alternating current amplifier output and a correction voltage input of said direct current amplifier, and means connected between said alternating current amplifier input and a point between said capacitor and filtering network for the alternate grounding thereof at a predetermined rate.

7. In a circuit of the class described having input and output terminals, the combination comprising a direct current amplifier having a signal voltage input thereof connected to said input terminals and the output connected to said output terminals and providing a negative output voltage for a positive input voltage, means connected between the signal voltage input and the output of said direct current amplifier to provide a voltage proportional to drift voltage therein, an alternating current amplifier having the input connected to said means and providing a positive voltage output for a positive voltage input, a series connected storage capacitor and filtering network connected between said alternating current amplifier output and a correction voltage input of said direct current amplifier, and a vibrator having a contact connected to the input of said alternating current amplifier, a contact connected between said capacitor and said filtering network, and a grounded contactor vibrating between said contacts at a predetermined rate.

References Cited in the file of this patent

UNITED STATES PATENTS

| Number | Name | Date |
|---|---|---|
| 2,208,349 | Ulbricht | July 16, 1940 |
| 2,297,543 | Eberhardt | Sept. 29, 1942 |
| 2,455,711 | Sziklai | Dec. 7, 1948 |
| 2,490,727 | Carpentier | Dec. 6, 1949 |
| 2,512,702 | White, Jr. | June 27, 1950 |